US012632791B2

(12) United States Patent
Gupta et al.

(10) Patent No.: US 12,632,791 B2
(45) Date of Patent: May 19, 2026

(54) SYSTEM AND METHOD FOR CONFIGURING AN ARTIFICIAL INTELLIGENCE PIPELINE

(71) Applicant: Asper.AI Inc., New York, NY (US)

(72) Inventors: Yadunath Gupta, Bangalore (IN); Praveen Tiwari, Bangalore (IN)

(73) Assignee: ASPER.AI INC., New York, NY (US)

( * ) Notice: Subject to any disclaimer, the term of this patent is extended or adjusted under 35 U.S.C. 154(b) by 105 days.

(21) Appl. No.: 18/535,427

(22) Filed: Dec. 11, 2023

(65) Prior Publication Data

US 2025/0117697 A1     Apr. 10, 2025

(30) Foreign Application Priority Data

Oct. 5, 2023     (IN) .............................. 202321066946

(51) Int. Cl.
G06N 20/00          (2019.01)
(52) U.S. Cl.
CPC .................................... G06N 20/00 (2019.01)
(58) Field of Classification Search
None
See application file for complete search history.

(56) References Cited

U.S. PATENT DOCUMENTS

2019/0394083 A1* 12/2019 Sglavo ................ H04L 41/0663
2021/0390466 A1   12/2021 Varadarajan et al.

| | | | | |
|---|---|---|---|---|
| 2022/0171985 A1* | 6/2022 | Gorbach | ............. | G06F 18/2113 |
| 2023/0072607 A1* | 3/2023 | Bawa | ................... | G06F 9/44526 |
| 2023/0289277 A1* | 9/2023 | Sathe | ................... | G06F 11/3452 |
| 2023/0418654 A1* | 12/2023 | Zuccarelli | ................ | G06N 5/01 |
| 2024/0037411 A1* | 2/2024 | Min | ..................... | G06N 3/0985 |
| 2024/0070465 A1* | 2/2024 | Abdelaal | ................ | G06N 3/088 |
| 2024/0104394 A1* | 3/2024 | Skerry-Ryan | ........... | G06N 3/08 |
| 2024/0152769 A1* | 5/2024 | Rossi | .................. | G06N 3/0985 |

FOREIGN PATENT DOCUMENTS

| CN | 109961098 A | 7/2019 |
|---|---|---|
| WO | 2020249125 A1 | 12/2020 |

OTHER PUBLICATIONS

Guimarães et al., "A Meta-Learning Approach to Error Prediction", 2021 16th Iberian Conference on Information Systems and Technologies (CISTI) (Year: 2021).*

(Continued)

*Primary Examiner* — Usmaan Saeed
*Assistant Examiner* — Beatriz Ramirez Bravo
(74) *Attorney, Agent, or Firm* — Jason A. Smith; Shumaker, Loop & Kendrick, LLP

(57)          ABSTRACT

A system and a method for configuring an AI pipeline. The system may receive raw information from a database. Further, one or more performance attributes are extracted from the raw information. A meta dataset is generated from the raw information to train a meta learning model. The meta learning model is trained based on the meta dataset, simulation data, and one or more machine learning algorithms. Subsequently, a configuration dataset is predicted based on the meta learning model. Further, a configuration file is generated based on the configuration dataset, the meta learning model, and an error minimization strategy.

19 Claims, 5 Drawing Sheets

200

Extracting one or more performance attributes from raw information. —202

Generating a meta dataset from the raw information for a meta learning model based on the one or more performance attributes. —204

Training the meta learning model based on the meta dataset, simulation data, and one or more machine learning algorithms. —206

Predicting a configuration dataset for the AI pipeline comprising at least one of a set of features, a training model, and a parameter search space based on the meta learning model. —208

Generating a configuration file based on the configuration dataset, the meta learning model, and an error minimization strategy. —210

(56) References Cited

OTHER PUBLICATIONS

Laadan et al., "RankML: Meta Learning-Based Approach for Pre-Ranking Machine Learning Pipelines", (Nov. 2019) (Year: 2019).*

Zheng et al., Evolving Fully Automated Machine Learning via Life-Long Knowledge Anchors, (Sep. 2021) (Year: 2021).*

Akiba et al., "Optuna: A Next-generation Hyperparameter Optimization Framework" (2019) (Year: 2019).*

Tian et al., "Meta-learning approaches for learning-to-learn in deep learning: A survey", Elsevier, (Apr. 2022) (Year: 2022).*

Wang et al., "ML2E: Meta-Learning Embedding Ensemble for Cold-Start Recommendation", IEEE, (Sep. 8, 2020) (Year: 2020).*

* cited by examiner

100

102

PROCESSOR(S) (108)

I/O INTERFACE (S) (110)

MEMORY (112)

DATABASE (114)

Network 106

104-1

104-2

104-N

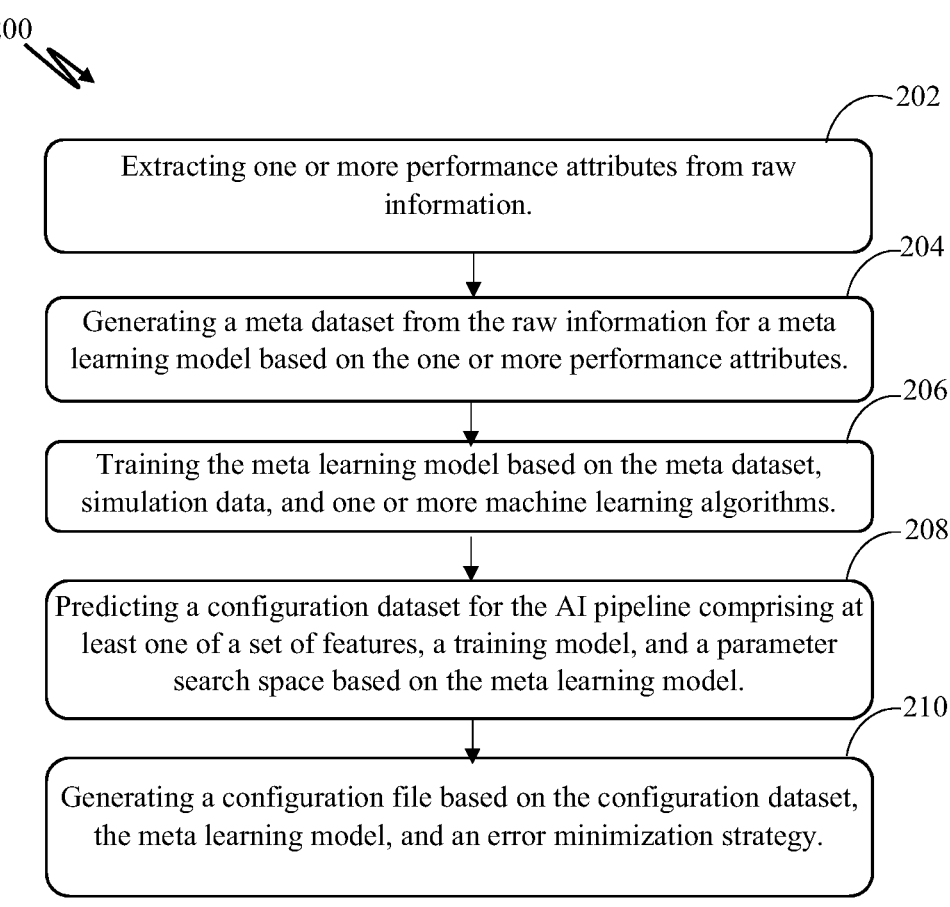

200

202

Extracting one or more performance attributes from raw information.

204

Generating a meta dataset from the raw information for a meta learning model based on the one or more performance attributes.

206

Training the meta learning model based on the meta dataset, simulation data, and one or more machine learning algorithms.

208

Predicting a configuration dataset for the AI pipeline comprising at least one of a set of features, a training model, and a parameter search space based on the meta learning model.

210

Generating a configuration file based on the configuration dataset, the meta learning model, and an error minimization strategy.

```
cust_name: dummy_customer
data_granularity:
  timestamp_column:
week_end_date
  frequency: W-SUN
forecasting_granularity:
SKU
ship_to
target_column: sales
numeric_features:
  - num_feature1
  - num_feature_2
categorical_features:
  - cat_feature1
  - cat_feature2
dtype:
  num_feature1: sum_non_empty
  num_feature_2: sum_non_empty
  cat_feature1: mode
  cat_feature2: mode
```

```
feature_engg:
  feature_types:
    - regressor
    - datetime
    - offset
    - relative
    - target_encoded
    - label_encoded
    - price
    - holiday_index
    - stockpiling
    - acv_smoothed
    - holiday
truncate_ts: False
max_val_rounds: 1
stride: 1
profile_data: False
refresh: True
scoring_methods: {}
min_samples_for_scoring: 2
base_price_offset: 8
scaling: False
```

FIGURE 3A

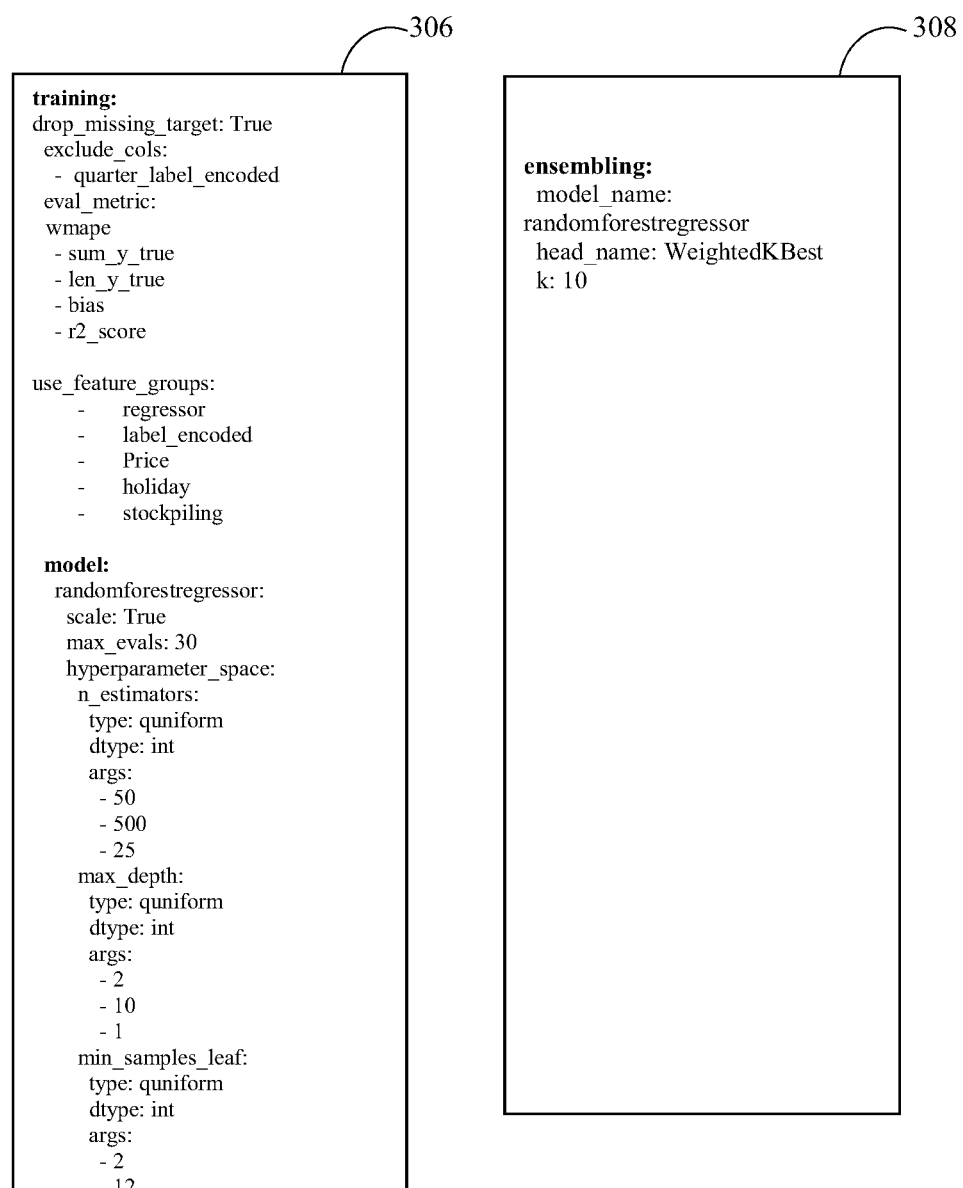

```
                                    306                            308 training:
drop_missing_target: True
 exclude_cols:                      ensembling:
  - quarter_label_encoded            model_name:
 eval_metric:                       randomforestregressor
 wmape                               head_name: WeightedKBest
  - sum_y_true                       k: 10
  - len_y_true
  - bias
  - r2_score use_feature_groups:
     -    regressor
     -    label_encoded
     -    Price
     -    holiday
     -    stockpiling model:
  randomforestregressor:
   scale: True
   max_evals: 30
   hyperparameter_space:
    n_estimators:
     type: quniform
     dtype: int
     args:
      - 50
      - 500
      - 25
    max_depth:
     type: quniform
     dtype: int
     args:
      - 2
      - 10
      - 1
    min_samples_leaf:
     type: quniform
     dtype: int
     args:
      - 2
      - 12
```

FIGURE 3B

SYSTEM AND METHOD FOR CONFIGURING AN ARTIFICIAL INTELLIGENCE PIPELINE

PRIORITY INFORMATION

The present application claims a priority from Indian Patent Application No. 202321066946 dated Oct. 5, 2023.

TECHNICAL FIELD

The present subject matter described herein, in general, relates to a system and a method for configuring an Artificial Intelligence (AI) pipeline, and in particular, for automatically generating a configuration file for the AI pipeline.

BACKGROUND

Artificial Intelligence (AI) pipelines have become an integral part of numerous applications, ranging from image recognition and natural language processing to predictive analytics and autonomous systems. The AI pipelines typically include various stages, such as data preprocessing, feature engineering, model training, and deployment. The performance and effectiveness of the AI pipelines heavily depend on the configuration settings chosen for each stage and component.

Configuring the AI pipelines involves selecting appropriate algorithms, setting hyperparameters, defining preprocessing techniques, and establishing data processing workflows. However, determining the optimal configuration for the AI pipelines is a complex task, often requiring substantial expertise and significant trial-and-error iterations. The vast space of available configuration options makes it challenging for users to identify the most suitable settings.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for configuring an AI pipeline. This summary is not intended to identify essential features of the claimed subject matter nor is it intended for use in determining or limiting the scope of the claimed subject matter.

In one implementation, a method for configuring an AI pipeline is disclosed. The method may comprise receiving raw information from at least one of a database, an external flat file, and a user. Further, one or more performance attributes may be extracted from the raw information. Subsequently, a meta dataset may be generated for a meta learning model based on the one or more performance attributes. Further, the meta learning model may be trained based on the meta dataset, simulation data, and one or more machine learning algorithms. Further, a configuration dataset may be predicted using the meta learning model. The configuration dataset may comprise at least one of a set of features, a training model, and a parameter search space.

Further, a configuration file may be generated based on the configuration dataset, the meta learning model, and an error minimization strategy.

In another implementation, a system for configuring an AI pipeline is disclosed. The system may receive raw information from at least one of a database, an external flat file, and a user. Further, the system may extract one or more performance attributes from the raw information. Subsequently, a meta dataset may be generated for a meta learning model based on the one or more performance attributes. Furthermore, the system may train a meta learning model based on the meta dataset, simulation data, and one or more machine learning algorithms. Further, the system may predict a configuration dataset comprising at least one of a set of features, a training model, and a parameter search space. Further, the system generates a configuration file based on the configuration dataset, the meta learning model, and an error minimization strategy.

In another implementation, a non-transitory computer program product having embodied thereon a computer program for configuring an AI pipeline is disclosed. The program may comprise a program code for extracting one or more performance attributes from raw information received from a user. Further, the program may comprise a program code for generating a meta dataset for a meta learning model based on the performance parameters. Further, the program may comprise a program code for training the meta learning model based on the meta dataset, simulation data, and one or more machine learning algorithms. Furthermore, the program may comprise a program code for predicting a configuration dataset comprising at least one of a set of features, a training model, and a parameter search space based on the meta learning model. Finally, the program may comprise a program code for generating a configuration file based on the configuration dataset, the meta learning model, and an error minimization strategy.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures, however, the invention is not limited to the specific method and system for configuring an AI pipeline in the document, and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

FIG. 2 illustrates a method for configuring an AI pipeline, in accordance with an embodiment of the present subject matter.

FIG. 3A shows an example of a configuration file, in accordance with an embodiment of the present subject matter.

FIG. 3B shows an example of a configuration file, in accordance with an embodiment of the present subject matter

Figure 1:
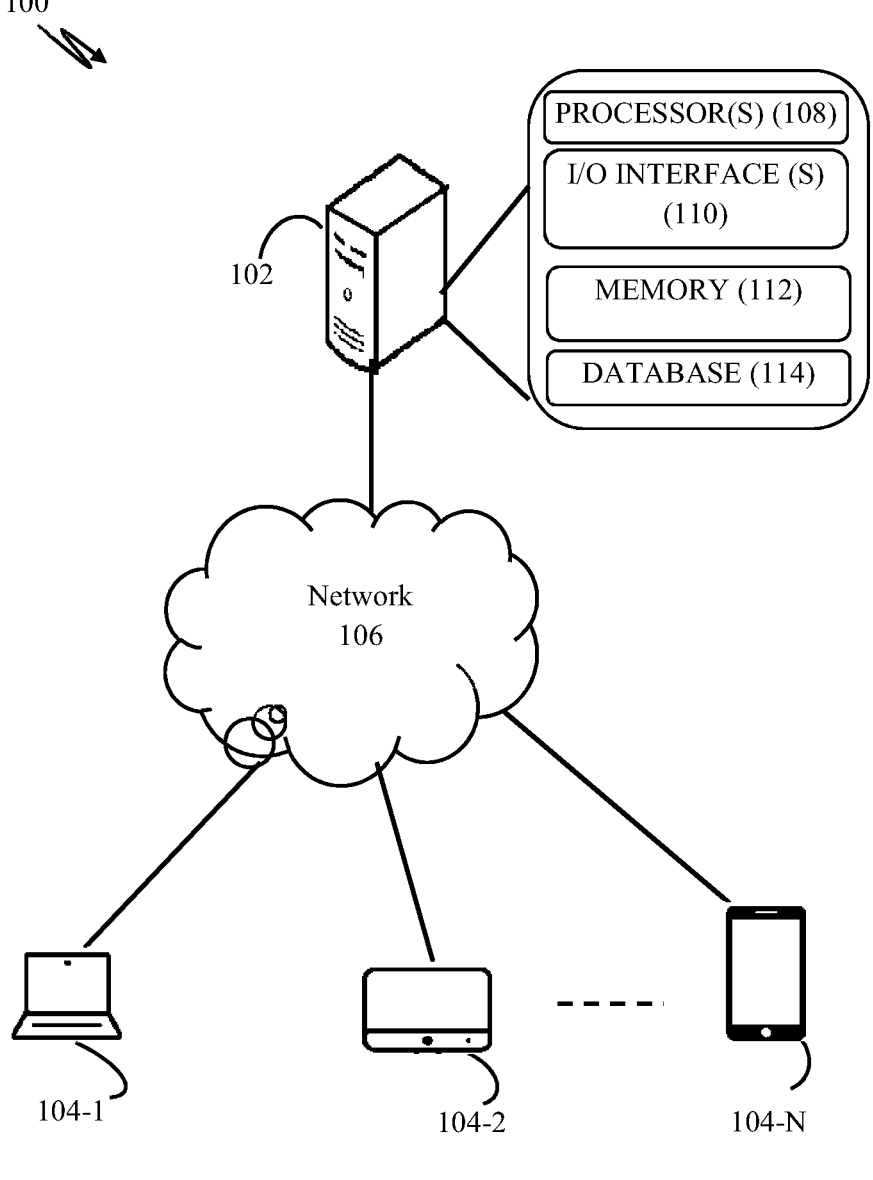
FIG. 1 illustrates a network implementation of a system for configuring an AI pipeline is disclosed, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "extracting", "generating," "predicting," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter introduces techniques for automating the configuration of AI pipelines. By leveraging machine learning techniques and automated search algorithms, the techniques enable efficient exploration of the configuration space to identify the settings for each stage of the AI pipeline such that the AI pipeline produces accurate output. The techniques take into account various factors, such as dataset characteristics, task requirements, computational resources, and performance objectives, to guide the configuration process.

The present subject matter discloses a system and a method for configuring an AI pipeline to perform a set of tasks. More importantly, the present invention discloses automating configuration of the AI pipeline by generating and optimizing a configuration file for the AI pipeline using a meta learning model. Initially, the system receives raw information from a database. The raw information includes data related to the set of tasks and historic information about the company. The historic information may comprise at least one of one or more AI pipelines used by the company, tasks performed using the one or more AI pipelines, historic iterations of the one or more AI pipelines, and historic iterations of the AI pipeline. Further, the system extracts one or more performance attributes from the raw information. Further, the system generates a meta dataset from the raw information for a meta learning model based on the one or more performance attributes. Further, the system trains the meta learning model based on the meta dataset, simulation data, and one or more machine learning algorithms. Furthermore, the system predicts a configuration dataset for the AI pipeline based on the meta learning model. The configuration dataset comprises at least one of a set of features, a training model, and a parameter search space. The system then generates a configuration file for the AI pipeline based on the configuration dataset, the meta learning model, and an error minimization strategy.

Certain technical challenges exist in configuring an AI pipeline. One technical challenge faced in configuring the AI pipeline is that a large amount of training data is required to train complex algorithms for high accuracy. The solution presented in the embodiments herein is to use a meta learning approach to utilise prior knowledge and simulation to train the complex algorithms. Another technical challenge is that configuring an AI pipeline requires a lot of human effort and time to adjust parameters for model training. The solution presented in the embodiments herein is to automatically generate a configuration file comprising the parameters for model training. A meta learning model is trained to generate the configuration file and continuously adjust the parameters in the configuration file to achieve a predefined accuracy. The detailed functioning of the system 102 is described below with the help of figures.

Another technical challenge in configuring the AI pipeline is that achieving and maintaining high accuracy is difficult and time-consuming because the settings are manually adjusted by trial-and-error method. The solution presented in the embodiments herein is to use simulation data. The simulation data is generated by the system by automatically adjusting the settings iteratively until a predefined accuracy is achieved. The accuracy may also be improved by using error minimization strategies such as feature engineering, model selection, hyperparameter tuning, cross-validation, and data cleaning.

While aspects of the described system and method for configuring an AI pipeline may be implemented in any number of different computing systems, environments, and/or configurations, the embodiments are described in the context of the following exemplary system.

Referring now to FIG. 1, a network implementation 100 of a system 102 for configuring an AI pipeline is disclosed. It may be noted that one or more users may access the system 102 through one or more user devices 104-2, 104-3 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include but are not limited to, a portable computer, a personal digital assistant, a handheld device, and a workstation. The user devices 104 are communicatively coupled to the system 102 through a network 106. In another implementation, the system 102 may be implemented on a user device 104 as a stand-alone system.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, a memory 112, and a database 114. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

The database 114 may store information received from a user and information generated by the system 102 as historic data such that the historic data may be accessed wirelessly via the network 106.

In operation, for configuring an AI pipeline, a user may use the user device 104 to access the system 102 via the I/O interface 110. The user may register the user devices 104 using the I/O interface 110 in order to use the system 102. In one aspect, the user may access the I/O interface 110 of the system 102.

The present subject matter describes the system 102 for configuring an AI pipeline. The system 102 may generate a configuration file for an Artificial Intelligence (AI) pipeline. In order to generate the configuration file, initially, the system 102 may receive raw information. In an embodiment, the system may receive the raw information from a database or from a user, for example, through a user device. The user may be an employee of a company planning to use the AI pipeline. The raw information comprises data related to a set of tasks for which the AI pipeline may be used. In an embodiment, the raw information may comprise information of the company including past records related to the set of tasks. For example, the past records may be bills and inventory data sheets for a set of tasks including inventory management. More examples of data included in the raw information are machine generated demand forecasts for past and future time periods, baseline and incremental sales, actual demand for historical periods, promo data, holiday data, competitor information, product attributes related information.

In another embodiment, the raw information received for a set of tasks may be used for another set of tasks to be performed by the AI pipeline. For example, let us assume that a first set of tasks was inventory management for a cosmetics company. The raw information included data regarding the domain of the company, number of products sold by the company, number of products manufactured by the company, etc. Let us assume that a new task is assigned to the AI pipeline. The new task may be sales management. The data such as the number of products sold, may be used to train the AI pipeline for the new task.

In another embodiment, the raw information may comprise requirements for completion of the task and budget information for the AI pipeline. Requirements may include accuracy, type of output, and the like. Budget information may include financial data of the company, invested amount for the AI project, and the like.

In an embodiment, the raw information may be extracted from external flat files. External flat files may contain the raw information in at least one of a textual format, a semi structured format, and in a predefined syntax.

Further to receiving the raw information, the system may use a descriptive statistics module 406 to extract performance attributes and generate a meta dataset for a meta learning model 404 based on the performance attributes, the raw information, and the set of tasks. In an embodiment, the descriptive statistics module may be used to extract the one or more performance attributes from the raw information. The descriptive statistics module is a logic code which extracts key information about the data to populate a database of attributes used by the meta learning model for configuring the AI pipeline The database may be called meta learning DB. For example, the attributes may include a set of values for the mean/median, distribution, frequency, skewness and kurtosis, percentiles and the like. The descriptive statistics module may analyse the raw information and identify patterns in the raw information, characteristics, and distribution of the raw information. In an embodiment, the raw information may include the set of tasks, information regarding each task in the set of tasks, past data entries regarding the set of tasks and requirements for the set of tasks (dependent variables/target variables/expected output). The descriptive statistics module may calculate statistics for the set of tasks based on the target variables and the past data entries. The statistics may be used to find similarity between one or more tasks from the set of tasks and understand relationships between the one or more tasks. The similar tasks may be clustered together such that the raw information for the one task of the similar tasks can be used to train the meta learning model for another task of the similar tasks by determining values for attributes used to train the meta learning model.

The meta learning model may be built to configure the AI pipeline using the raw information. The meta learning model may be trained to produce an output comprising a configuration file for the AI pipeline to perform the set of tasks. The descriptive statistics module may include a logic code that may identify and extract key information from raw information. The key information may include the one or more performance attributes, and the meta dataset.

In an embodiment, the performance attributes may include granularity of output, forecast/elasticity, optimization metrics, refresh frequency, cloud cost, execution time of the AI pipeline, and the like. The meta dataset may comprise a training set of tasks, corresponding input data for the training set of tasks, and corresponding output data for the training set of tasks, wherein the training set of tasks includes tasks other than the set of tasks to be performed by the AI pipeline. The input data may vary based on the set of tasks to be performed by the AI pipeline. Consider an example, the meta learning model is used to configure an AI pipeline for a task of demand forecasting for a packaged food supplier. The input data may include a set of training set of tasks such as increasing profit, improving delivery time, and the like. Further, input data corresponding to the training set of tasks may include product portfolio of the packaged food supplier, past sales, past delivery details, target markets, and the like. The output data corresponding to the training set of tasks may include a set of features, a set of parameters, and a type of machine learning technique used in the training model for the AI pipeline to perform the training set of tasks.

In another embodiment, the input data may comprise a set of tasks to be performed by an AI pipeline, performance attributes, and expected output of the AI pipeline. The output data may comprise corresponding configuration files for the AI pipeline for the set of tasks. Another example of input data may be a set of features, a set of parameters for the AI pipeline, an accuracy, and the output data may comprise corresponding set of values for the set of features and set of parameters.

In another embodiment, the system 102 may include a machine learning module in addition or as an alternative to the descriptive statistics module to extract key information from raw information using a machine learning algorithm. The machine learning algorithm may be trained using raw information related to a plurality of tasks for a plurality of companies and corresponding key information for each task for each company.

Further to extracting the meta dataset and performance attributes, the system 102 may train the meta learning model based on the meta dataset, simulation data, and one or more machine learning algorithms. The simulation data may comprise a testing dataset, for the meta learning model, comprising a meta testing dataset for a set of testing tasks, and corresponding output testing dataset for the set of testing tasks, and wherein output of the meta learning model is compared to the output testing dataset to generate feedback and retrain the meta learning model. The testing dataset is used to evaluate the performance of the trained meta-learning model. It includes new tasks or datasets that the meta learning model has not been exposed to during training. In an embodiment, a simulation module 408 may be used to generate (i.e., synthesize) the simulation data comprising the testing dataset using one or more machine learning algorithms. The one or more machine learning algorithms may be trained to generate testing dataset based on raw information, set of tasks, and historic information. Further, the one or more machine learning algorithms may be trained to calculate accuracy of the AI pipeline configured using the meta learning model. The accuracy may be calculated by comparing the output of the AI pipeline with the expected output provided in the testing dataset. Based on the accuracy, the one or more machine learning algorithms may provide feedback for generation of simulation data using different feature lists, machine learning models, and hyperparameters specified by the meta learning model. When the accuracy matches a predefined accuracy by optimizing the machine learning model to a particular level, the meta learning model may be considered as trained.

Further to training the meta learning model, the system may predict a configuration dataset for the AI pipeline based on the meta learning model. The configuration dataset may comprise at least one of a set of features, a training model, and a parameter search space. The set of features may comprise one or more data preprocessing features, one or more model training features, one or more model evaluation features, and model development features.

The data preprocessing features may include the following:

Input Data Path: Specifies the path or location of the raw data files to be used as input for data preprocessing.

Output Data Path: Defines the path where the preprocessed data will be saved.

Feature Selection: A Boolean flag indicating whether feature selection should be performed during preprocessing.

The model training features may include the following:

Model Type: Specifies the type or architecture of the machine learning techniques and machine learning algorithms used for the training model of the AI pipeline. As an example, but not limited to, the machine learning techniques and machine learning algorithms may include at least one of neural network, decision tree, clustering, classification, reinforcement learning, and support vector machine.

Hyperparameters: Sets the values of hyperparameters used for model training, such as learning rate, regularization strength, or number of layers.

Training Data Path: Defines the path or location of the preprocessed data to be used for model training.

Validation Split: Determines the ratio or proportion of the training data to be used for validation during model training.

The model evaluation features may include the following:

Evaluation Metrics: Specifies the evaluation metrics to be used for assessing the model's performance, such as accuracy, precision, recall, or F1 score.

Test Data Path: Sets the path or location of the data to be used for evaluating the trained model's performance.

Evaluation Output Path: Defines the path where the evaluation results or metrics will be saved.

The model deployment features may include the following:

Deployment Environment: Specifies the target environment for model deployment, such as a cloud-based platform or on-premises infrastructure.

API Configuration: Defines the API endpoints, input/output formats, and any required preprocessing or postprocessing steps for interacting with the deployed model.

Scalability Options: Specifies configuration settings related to scalability and performance, such as batch processing, parallelization, or hardware acceleration.

The parameter search space or the hyperparameter space, may refer to the range or set of possible values that can be assigned to the hyperparameters of a machine learning model. The hyperparameter space represents the multidimensional space in which the hyperparameters exist, and it defines the boundaries within which hyperparameter tuning is performed.

The hyperparameter space can vary depending on the specific model and the hyperparameters being considered. Each hyperparameter typically has its own range or set of valid values. For example:

Learning Rate: [0.001, 0.01, 0.1]
Number of Hidden Layers: [1, 2, 3]
Number of Neurons per Layer: [32, 64, 128]
Activation Function: ['relu', 'sigmoid', 'tan h']

In this example, the hyperparameter space includes different possible combinations of values for the learning rate, number of hidden layers, number of neurons per layer, and activation function. The hyperparameter space can be represented as a Cartesian product of the individual hyperparameter sets.

The size and complexity of the hyperparameter space depend on the number of hyperparameters and the granularity of their values. As the number of hyperparameters increases or the ranges of values become larger, the hyperparameter space expands exponentially.

The training model may be at least one of Neural Networks, Decision Trees, Random Forests, k-Nearest Neighbors, Support Vector Machines, Multi-Label Naive Bayes, Logistic Regression, and the like.

Finally, the system may generate a configuration file for the AI pipeline by populating the configuration file with the predicted configuration dataset. The configuration file may be generated based on the meta learning model and an error minimization strategy. In one example, further, to generating an initial configuration file based on the configuration dataset, the system may modify the configuration file based on the error minimization strategy. The accuracy of the AI pipeline may be improved using the error minimization strategy. The accuracy of an AI pipeline/model is represented by Weighted Mean Absolute Percentage Error (WMAPE) or Mean Absolute Percentage Error (MAPE). MAPE is a commonly used metric to measure the accuracy and performance of a forecasting or predictive AI model, particularly in the field of time series analysis and demand forecasting. MAPE represents the average percentage difference between the predicted and actual values of a variable.

The formula for calculating the MAPE is as follows:

$$MAPE = (1/n) * \sum (|(\text{Actual} - \text{Predicted})/\text{Actual}) * 100$$

In the formula, 'n' is the number of observations or data points in the dataset. 'Actual' represents the actual observed values of the variable being predicted. 'Predicted' represents the corresponding predicted values generated by the model.

The formula for calculating WMAPE is as follows:

$$WMAPE =$$
$$(1/\sum (\text{Weight})) * \sum (|(\text{Actual} - \text{Predicted})/\text{Actual}| * \text{Weight}) * 100$$

Where 'Weight' represents the weight assigned to each data point. The weights can be determined based on factors like the importance or frequency of data points in the forecasting task.

WMAPE allows for prioritizing certain data points in the calculation of the percentage errors, which can be beneficial when certain observations have a more significant impact on the overall forecasting accuracy.

MAPE provides an indication of the magnitude of the errors in percentage terms. It measures the average relative difference between the predicted and actual values, which allows for comparison across different scales and magnitudes of the variable being forecasted.

The error minimization strategy may comprise at least one of the following.

Feature engineering: Rework on the features and see which variable is creating an impact and improving the overall error. Reworking on the features in the configuration file to identify a set of features that affect the accuracy of the AI pipeline. Further, adjusting the set of features to minimize overall error.

Training Model re-selection: Selecting an alternate training model from the configuration dataset to minimize the MAPE. In another example, one or more training models may be added to the configuration dataset to minimize the MAPE.

Hyperparameter tuning: Hyperparameters are the parameters that define the behavior of the AI pipeline. The hyperparameters may be tuned to improve the accuracy of the model and reduce the MAPE. Examples of hyperparameters may include learning rate, batch size, number of hidden layers, number of neurons per layer, regularization strength, dropout rate, and activation functions.

Cross-validation: Cross-validation is a technique used to assess the performance of a training model. By performing cross-validation, the error may be estimated for the training models and the training model having the minimum MAPE may be chosen for training the AI pipeline.

Data cleaning: Data cleaning is the process of removing or correcting the errors in the input data. By cleaning the input data, accuracy of the AI pipeline may be increased.

In another embodiment, a non-transitory computer program product having embodied thereon a computer program for configuring an AI pipeline is disclosed. The computer program product may receive raw information. Further, the computer program product may comprise a program code for a descriptive statistics module. The descriptive statistics module may be used to analyse the raw information to extract meta dataset and one or more performance attributes to train a meta learning model. Further, the computer program product may comprise a program code for training the meta learning model using the meta dataset, simulation data, and one or more machine learning models. The computer program product may comprise a program code for a simulation module to generate simulation data including meta testing data. Further, the computer program product may comprise a program code for generating a configuration dataset based on the meta learning model. The computer program product may comprise a program code to generate a configuration file based on the configuration dataset, the meta learning model, and an error minimization strategy.

Referring now to FIG. 2, a method 200 for configuring an AI pipeline is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for configuring an AI pipeline. Furthermore, the method 200 for configuring an AI pipeline can be implemented in any suitable hardware, software, firmware, or combination thereof. However, for ease of explanation, in the embodiments described below, the method 200 may be considered to be implemented in the above-described system 102.

At block 202, one or more performance attributes may be extracted from the raw information.

At block 204, a meta dataset, from the raw information, for the meta learning model may be generated based on the one or more performance attributes.

At block 206, the meta learning model may be trained based on the meta dataset, simulation data, and one or more machine learning algorithms.

At block 208, a configuration dataset may be predicted based on the meta learning model.

At block 210, a configuration file may be generated based on the configuration dataset, the meta learning model, and an error minimization strategy.

FIG. 3A and FIG. 3B illustrate an example configuration file 300 for an AI pipeline. The meta learning model may be used to populate the data in the configuration file. In an embodiment, the user may provide input to modify the configuration file by adding one or more parameters or features. Part 302 comprises a set of performance attributes and a set of features. Part 304 comprises a set of features selected for the AI pipeline, and information regarding the features. Part 306 comprises parameters for training the AI pipeline and the model used by the AI pipeline. Part 308 comprises information regarding ensembling strategy used for the AI pipeline. The ensembling strategy allows using data from past usage of the AI pipeline for a new task.

Figure 4:
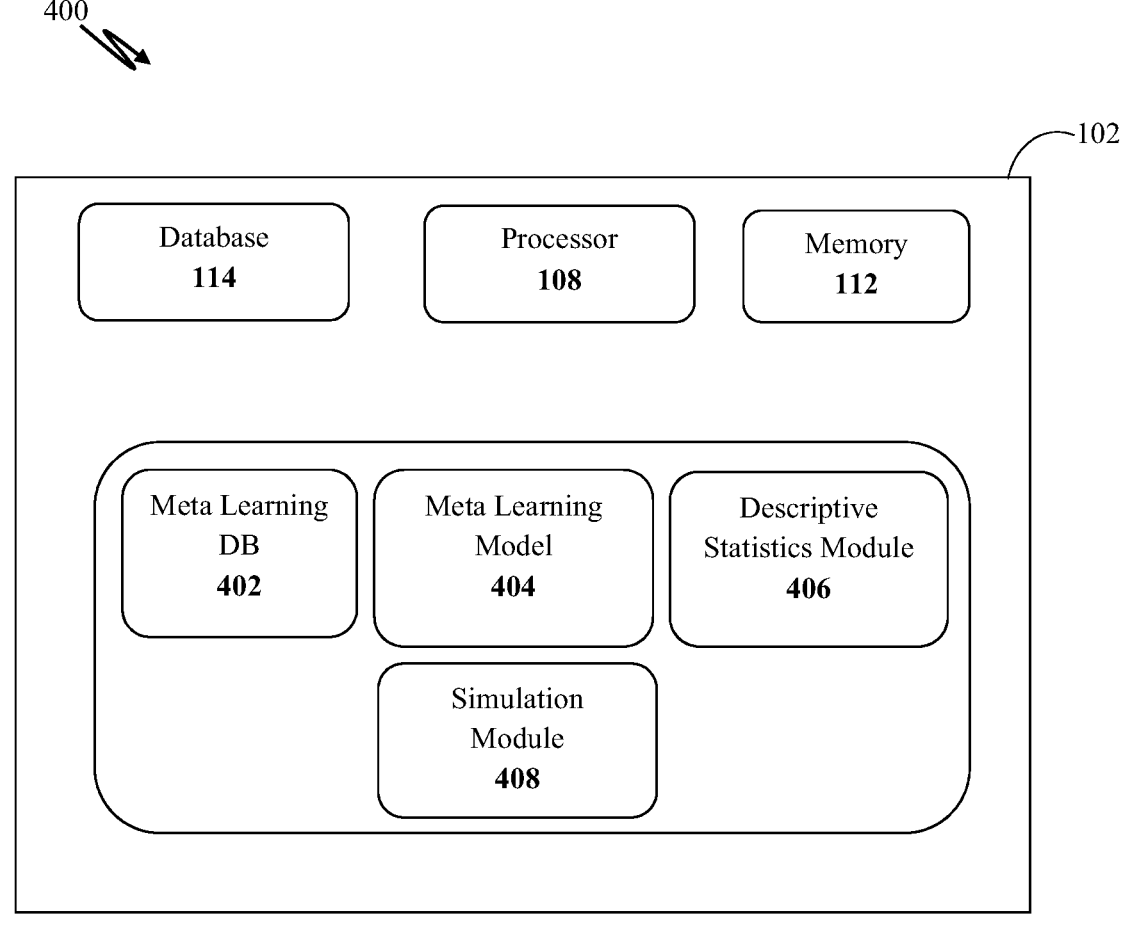
FIG. 4 illustrates an example system 102 for configuring an AI pipeline, in accordance with an embodiment of the present subject matter.

FIG. 4 illustrates an example 400 of the system 102 for configuring an AI pipeline. As seen in the FIG. 4, the system may comprise a Meta Learning Database (Meta Learning DB) 402, the meta learning model 404, a descriptive statistics module 406, and a simulation module 408. The Meta Learning DB may comprise a list of attributes used to configure the AI pipeline for a set of tasks. An example of the list of attributes that a meta learning DB generated by the meta learning model while configuring the AI pipeline may comprise:

Type of Industry—The attribute "Type of Industry" may provide an indication towards what type of data may be received as raw information by identifying types of services provided by the company corresponding to the raw information received. Examples of values for the attribute may include at least one of "Banking," "Retail," and "Healthcare." The "type of industry" may contribute to better selection of values for other attributes.

Distribution—The distribution may be set as a mathematical function such as beta/lognorm/norm/gamma. The distribution may be used to make probabilistic predictions about the data. The distribution of the data may also be used for better data preprocessing. Examples of distribution may include at least one of "Normal," "Poisson," "Uniform," "Binomial," and the like.

Mean and Median—The mean and median of dependent variables (expected output of the meta learning model) may be used to draw insights about distribution of the data in the raw information. The descriptive statistics module may be used to calculate the mean and median. For example, for raw information comprising data about home prices, the mean is the average price of a home in the data and median is the price of a middle-ranked home.

Variance: Variance signifies the difference between the minimum value of a dependent variable and the mean. The variance of the data in the raw information may be used to determine pre-processing techniques for the data.

IQR: Inter Quartile range of the data measures the statistical dispersion in the data. The IQR of a data set is calculated as the range of values between the $25^{th}$ percentile and the $75^{th}$ percentile of the data. For example, in a dataset of household incomes, the IQR would represent the income range that encompasses the middle 50% of households. The IQR may be used to detect outliers in the data.

Skewness and Kurtosis: Skewness refers to the asymmetry of the data distribution, while kurtosis measures the degree of peakiness or flatness in the distribution. Both indicators provide insights into the shape of the dataset, in other words, the distribution of the data. Skewness and Kurtosis can be used to determine preprocessing steps for the raw information for better training of the AI pipeline.

Percentile (various intervals): Percentile value represents the value below which a percentage of the data falls. For example, the 25 percent of the data falls below the $25^{th}$ percentile.

numeric_features_count: Number of numerical features used by the meta learning model for configuring the AI pipeline.

categorical_feature_count: Number of categorical features used by the meta learning model for configuring the AI pipeline.

numeric_feature_count_fe: Count of numeric features generated to configure an AI pipeline for a specific set of tasks. These features may be derived from other features. For example, "income squared."

categorical_feature_count_fe: Count of categorical features generated to configure an AI pipeline for a specific set of tasks.

temporal_features_count: Count of time related features used for configuring an AI pipeline when the raw information comprises time series data.

temporal_features_count_fe: Count of time related features generated for a specific set of tasks.

records_for_modelling: Number of records used for configuring the AI pipeline. Consider an example, the raw information comprises data having 1000 entries. In this case, the records for modelling will be 1000.

Modelled_at_group_level: This attribute is an indicator of whether the data was grouped for training or not. Grouping of data helps in increasing accuracy of the meta learning model. Example values for the attribute may be "Y" and "N." "Y" if the data was grouped for training and "N" if the data was not grouped for training the meta learning model.

no_of_groups_created: If the data is grouped, the number of groups created by splitting the data is represented by no_of_groups_created.

ensembling_strategy: Ensembling strategy used while configuring the AI pipeline corresponds to the approach used for combining the predictions from multiple training models used to configure the AI pipeline. The examples of ensembling_strategy may include at least one of Trusted Software Stack Stacking (TSSStacking), Stacking, None. Combining predictions of multiple training models may improve accuracy of the AI pipeline if a correct ensembling strategy is used.

metric: Metric represents the evaluation parameter for assessing the performance of the AI pipeline. An example metric may be WMAPE.

metric_value: metric_value is the numerical value of the metric determined upon testing the AI pipeline.

feature_numerical: List of numerical features used by the meta learning model. Examples of numerical features may be "age," "income," and the like.

feature_categorical: List of categorical features used by the meta learning model. Examples of categorical features may include "gender," "country," and the like.

model_name: Name of the training model used to configure the AI pipeline for a set of tasks. The training models may be at least one of Randomforest, XGB, ConstraintLR, multi-LayerPerceptron, Wavenet, LSTM, Transformers.

hyperparameter_space: Hyperparameter space is the range of possible values for the hyper parameters used in training the meta learning model.

imputation_percentage: imputation_percentage represents the proportion of missing records from the data received as raw information. The missing records may be filled with the mean or the median to train the meta learning model even with missing data records without hampering the accuracy.

id_columns: id is a unique id or a label for a set of values in the data. For example, if the data comprises values that denote the stock prices at a particular time the id may be price_at_time. The id is used to organize the data for faster analysis.

run_cost: run_cost represents the financial or resource related expenses associated with running the given AI pipeline for completing a set of tasks.

run_time: run_time represents the amount of time taken by the AI pipeline to complete a set of tasks.

frequency: frequency corresponds to the frequency at which the raw information is received. The possible values could be daily/weekly/monthly. "frequency" may also correspond to the frequency of a task performed by the AI pipeline.

Customer-name: Customer-name may be an identifier for the client or the organization for which the AI pipeline is trained using the meta learning model.

The meta learning DB may comprise multiple values for the above attributes that may be generated during training of the meta learning model 404. The meta learning model may be trained by the system to configure the AI pipeline for a set of tasks.

Further, the system may comprise the descriptive statistics module 406. The descriptive statistics module may analyze the raw information to generate the meta dataset and statistical insights from the raw information to train the meta learning model.

Further, the system may comprise a simulation module 408. The simulation module may be used to train the AI pipeline such that the AI pipeline achieves a predefined accuracy. The simulation module may use one or more machine learning algorithms for generating testing datasets.

Exemplary embodiments discussed above may provide certain advantages. Though not required to practice aspects of the disclosure, these advantages may include the following.

Some embodiments of the system and the method may increase efficiency of training AI models.

Some embodiments of the system and the method may reduce human effort in AI based applications.

Some embodiments of the system and the method may reduce the amount of training data required to train an AI pipeline.

Some embodiments of the system and the method may allow an AI pipeline to be trained for a new task using information from old tasks performed by the AI pipeline.

Some embodiments of the system and the method may use a simulation model to reduce time required to train the AI pipeline and increase efficiency of the AI pipeline by testing various settings of the AI pipeline.

Although implementations for methods and system for configuring an AI pipeline have been described in language specific to structural features and/or methods, it is to be understood that the appended claims are not necessarily limited to the specific features or methods described. Rather, the specific features and methods are disclosed as examples of implementations for configuring an AI pipeline.

The invention claimed is:

1. A method for automated generation of a configuration file for configuring an Artificial Intelligence (AI) pipeline, the method being directed to minimizing prediction error of the AI pipeline configured to perform a set of tasks, the method comprising:

receiving, by a processor, raw information comprising data related to the set of tasks, and historic information;

extracting, by the processor, one or more performance attributes from the raw information using a logic code that analyzes the raw information to populate a meta learning database of attributes comprising mean/median, distribution, frequency, skewness, kurtosis, percentiles, and feature counts;

calculating, by the processor, statistics for the set of tasks based on target variables and past data entries, using the statistics to find similarity between one or more tasks and to cluster similar tasks;

in response to the similarity, determining the one or more performance attributes for a current set of tasks based on raw information of a similar task from the set of tasks, such that the raw information received previously for the similar task is used for the current set of tasks;

generating, by the processor, a meta dataset from the raw information for a meta learning model based on the extracted one or more performance attributes;

training, by the processor, the meta learning model based on the meta dataset, simulation data, and one or more machine learning algorithms, wherein the training comprises:

generating a testing dataset based on raw information, the set of tasks, and the historic information;

calculating accuracy of the AI pipeline configured by the meta learning model by comparing an output of the AI pipeline with an expected output provided in the testing dataset, wherein the accuracy of an AI pipeline is represented by Weighted Mean Absolute Percentage Error (WMAPE) score;

generating feedback, using the one or more machine learning algorithms, for the meta learning model based on the accuracy of the AI pipeline; and updating the meta learning model based on the feedback, wherein the feedback is used to generate additional simulation data, and wherein the meta learning model is continuously updated until the accuracy of the AI pipeline is greater than a predefined threshold;

predicting, by the processor, a configuration dataset for the AI pipeline using the meta learning model, wherein the configuration dataset comprises a parameter search space, training features, and a training model, wherein the parameter search space continuously adjusts based on real-time performance metrics of the AI pipeline, wherein the parameter search space is defined as a cartesian product of hyperparameter sets including at least learning rate, number of hidden layers, number of neurons per layer, and activation function, and wherein the training features comprises a validation split, training path, model type, and hyperparameters;

minimizing, by the processor, error in the configuration dataset by applying error minimization strategies, the error-minimization strategies comprising:

hyperparameter tuning by iteratively evaluating candidate tuples from the cartesian product and narrowing value ranges for subsequent iterations based on observed WMAPE;

training-model re-selection by evaluating plurality of training models specified in the configuration dataset and selecting a model having minimum WMAPE;

cross-validation by splitting partitioning training data according to splits defined in the configuration dataset and computing WMAPE across the splits to guide the hyperparameter tuning and training-model re-selection; and generating, by the processor, a configuration file for the AI pipeline based on the configuration dataset, the meta learning model, and the error minimization strategy.

2. The method as claimed in claim 1, wherein the raw information is received from a database, and wherein the raw information includes data related to the set of tasks and historic information.

3. The method as claimed in claim 1, wherein the one or more performance attributes are related to requirements and budget.

4. The method as claimed in claim 1, wherein the meta dataset comprises a training set of tasks, corresponding input data for the training set of tasks, and corresponding output data for the training set of tasks, wherein the training set of tasks includes tasks other than the set of tasks.

5. The method as claimed in claim 1, wherein the simulation data comprises a testing dataset, for the meta learning model, comprising a meta testing dataset for a set of testing tasks, and corresponding output testing dataset for the set of testing tasks, and wherein output of the meta learning model is compared to the output testing dataset to generate feedback and retrain the meta learning model.

6. The method as claimed in claim 1, wherein the set of features comprises at least one of data preprocessing features, model training features, model evaluation features, and model deployment features for the AI pipeline.

7. The method as claimed in claim 1, wherein the training model corresponds to type of machine learning techniques, and architecture of machine learning techniques used in the AI pipeline.

8. The method as claimed in claim 1, wherein the parameter search space comprises at least one of a range and a set of values for the set of features.

9. The method as claimed in claim 1, comprising modifying an initial configuration file based on the error minimization strategy, wherein the error minimization strategy is at least one of feature engineering, training model reselection, feature tuning, cross validation, and data cleaning, to generate the configuration file.

10. A system for automated generation of a configuration file for configuring an Artificial Intelligence (AI) pipeline, that minimizes, prediction error of the AI pipeline configured to perform a set of tasks, the system comprising:

a memory;

a processor coupled to the memory, wherein the processor is configured to execute a set of instructions stored in the memory for:

receiving raw information comprising data related to the set of tasks, and historic information;

extracting one or more performance attributes from the raw information using a logic code that analyzes the raw information to populate a meta learning database of attributes, the attributes comprising mean/median, distribution, frequency, skewness, kurtosis, percentiles, and feature counts;

calculating statistics for the set of tasks based on target variables and past data entries, using the statistics to find similarity between one or more tasks and to cluster similar tasks;

in response to the similarity, determining the one or more performance attributes for a current set of tasks based on raw information of a similar task from the set of tasks, such that the raw information received previously for the similar task is used for the current set of tasks;

generating, using the descriptive statistics module, a meta dataset from the raw information for a meta learning model based on the extracted one or more performance attributes;

training, using a simulation module, the meta learning model based on the meta dataset, simulation data, and one or more machine learning algorithms, wherein the training comprises:

generating a testing dataset based on raw information, set of tasks, and historic information;

calculating accuracy of the AI pipeline configured by the meta learning model by comparing an output of the AI pipeline with an expected output provided in the testing dataset, wherein the accuracy of an AI pipeline is represented by Weighted Mean Absolute Percentage Error (WMAPE) score;

generating feedback, using the one or more machine learning algorithms, for the meta learning model based on the accuracy of the AI pipeline; and updating the meta learning model based on the feedback, wherein the feedback is used to generate additional simulation data, and wherein the meta learning model is continuously updated until the accuracy of the AI pipeline is greater than a predefined threshold;

predicting a configuration dataset for the AI pipeline using the meta learning model, wherein the configuration dataset comprises a parameter search space, training features, and a training model, wherein the parameter search space continuously adjusts based on real-time performance metrics of the AI pipeline, wherein the parameter search space is defined as a cartesian product of hyperparameter sets including at least learning rate, number of hidden layers, number of neurons per layer, and activation function, and wherein the training features comprises a validation split, training path, model type, and hyperparameters;

minimizing, by the processor, error in the configuration dataset by applying error minimization strategies, the error-minimization strategies comprising:

hyperparameter tuning by iteratively evaluating candidate tuples from the cartesian product and narrowing value ranges for subsequent iterations based on observed WMAPE;

training-model re-selection by evaluating plurality of training models specified in the configuration dataset and selecting a model having minimum WMAPE;

cross-validation by splitting partitioning training data according to splits defined in the configuration dataset and computing WMAPE across the splits to guide the hyperparameter tuning and training-model re-selection; and generating a configuration file for the AI pipeline based on the configuration dataset, the meta learning model, and the error minimization strategy.

11. The system as claimed in claim 10, wherein the raw information is received from a database, and wherein the raw information includes data related to the set of tasks and historic information.

12. The system as claimed in claim 10, wherein the one or more performance attributes are related to requirements and budget.

13. The system as claimed in claim 10, wherein the meta dataset comprises a training set of tasks, corresponding input data for the training set of tasks, and corresponding output data for the training set of tasks, wherein the training set of tasks includes tasks other than the set of tasks.

14. The system as claimed in claim 10, wherein the simulation data comprises a testing dataset, for the meta learning model, comprising a meta testing dataset for a set of testing tasks, and corresponding output testing dataset for the set of testing tasks, and wherein output of the meta learning model is compared to the output testing dataset to generate feedback and retrain the meta learning model.

15. The system as claimed in claim 10, wherein the set of features comprises at least one of data preprocessing features, model training features, model evaluation features, and model deployment features for the AI pipeline.

16. The system as claimed in claim 10, wherein the training model corresponds to type of machine learning techniques, and architecture of machine learning techniques used in the AI pipeline.

17. The system as claimed in claim 10, wherein the parameter search space comprises at least one of a range and a set of values for the set of features.

18. The system as claimed in claim 10, comprising modifying an initial configuration file based on the error minimization strategy, wherein the error minimization strategy is at least one of feature engineering, training model re-selection, feature tuning, cross validation, and data cleaning, to generate the configuration file.

19. A non-transitory computer readable medium for automated generation of a configuration file for configuring an AI pipeline, that minimizes prediction error of the AI pipeline configured to perform a set of tasks, the non-transitory computer readable medium storing instructions for:

receiving raw information comprising data related to the set of tasks, and historic information;

extracting one or more performance attributes from the raw information, using a logic code that analyzes the raw information to populate a meta learning database of attributes, the attributes comprising mean/median, distribution, frequency, skewness, kurtosis, percentiles, and feature counts;

calculating statistics for the set of tasks based on target variables and past data entries, using the statistics to find similarity between one or more tasks and to cluster similar tasks;

in response to the similarity, determining the one or more performance attributes for a current set of tasks based on raw information of a similar task from the set of tasks, such that the raw information received previously for the similar task is used for the current set of tasks;

generating a meta dataset from the raw information for a meta learning model based on the extracted one or more performance attributes;

training the meta learning model based on the meta dataset, simulation data, and one or more machine learning algorithms, wherein the training comprises:

generating a testing dataset based on raw information, the set of tasks, and the historic information;

calculating accuracy of the AI pipeline configured by the meta learning model by comparing an output of the AI pipeline with an expected output provided in the testing dataset, wherein the accuracy of an AI pipeline is represented by Weighted Mean Absolute Percentage Error (WMAPE) score;

generating feedback, using the one or more machine learning algorithms, for the meta learning model based on the accuracy of the AI pipeline; and updating the meta learning model based on the feedback, wherein the feedback is used to generate additional simulation data, and wherein the meta learning model is continuously updated until the accuracy of the AI pipeline is greater than a predefined threshold;

predicting a configuration dataset for the AI pipeline using the meta learning model, wherein the configuration dataset comprises a parameter search space, training features, and a training model, wherein the parameter search space continuously adjusts based on real-time performance metrics of the AI pipeline, wherein the parameter search space is defined as a cartesian product of hyperparameter sets including at least learning rate, number of hidden layers, number of neurons per layer, and activation function, and wherein the training features comprises a validation split, training path, model type, and hyperparameters;

minimizing error in the configuration dataset by applying error minimization strategies, the error-minimization strategies comprising:

hyperparameter tuning by iteratively evaluating candidate tuples from the cartesian product and narrowing value ranges for subsequent iterations based on observed WMAPE;

training-model re-selection by evaluating plurality of training models specified in the configuration dataset and selecting a model having minimum WMAPE;

cross-validation by splitting partitioning training data according to splits defined in the configuration dataset and computing WMAPE across the splits to guide the hyperparameter tuning and training-model re-selection; and generating a configuration file for the AI pipeline based on the configuration dataset, the meta learning model, and error minimization strategy.

* * * * *